United States Patent [19]

Ross

[11] 4,205,346
[45] May 27, 1980

[54] VIDEO TRANSITION CIRCUITRY INCLUDING TRANSITION PREVIEWING MEANS

[75] Inventor: John D. Ross, Iroquois, Canada

[73] Assignee: Ross Video Limited, Iroquois, Canada

[21] Appl. No.: 914,611

[22] Filed: Jun. 9, 1978

[51] Int. Cl.$^2$ .............................................. H04N 5/22
[52] U.S. Cl. ..................................... 358/181; 358/182
[58] Field of Search ............... 358/181, 182, 183, 185, 358/21, 22, 160

[56] References Cited

U.S. PATENT DOCUMENTS

| 3,506,965 | 4/1970 | Dowling et al. | 358/181 |
| 3,604,849 | 9/1971 | Skrydstrup | 358/182 |

Primary Examiner—James W. Moffitt
Assistant Examiner—Joseph A. Popek

Attorney, Agent, or Firm—Gerald J. Ferguson, Jr.; Joseph J. Baker

[57] ABSTRACT

Improved video transition circuitry including circuitry for previewing transitions from an on-air event signal to a next event signal. The circuitry includes a program transition switch responsive to the on-air event and next event signals for outputting the on-air event signal; a preview transition switch respnsive to the on-air event and next event signals for outputting the next event signal; transition control circuitry for either (a) controlling the program transition switch to effect a predetermined transition at the output of the program transition switch from the on-air event signal to the next event signal or (b) controlling the preview transition switch to effect a preview of the predetermined transition at the output of the preview transition switch where the predetermined transition may be, for example, a dissolve, a wipe or a bordered wipe.

17 Claims, 14 Drawing Figures

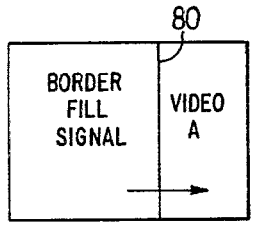
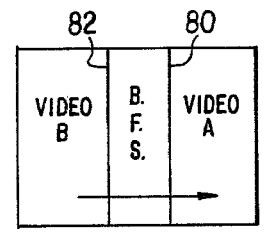

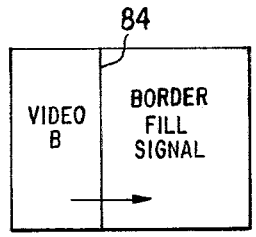
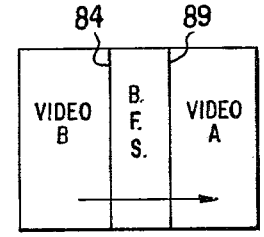

FIG. 5

M = CUT  
N = DISSOLVE  
O = WIPE  
P = P/V  
Q = BORDERED WIPE

C1 = A SIDE BORDER  
C2 = B SIDE BORDER  
C3 = PROGRAM TRANSITION  
C4 = P/V TRANSITION

| | M | N | O | P | Q | C1 | C3 | C2 | C4 |
|---|---|---|---|---|---|---|---|---|---|
| 1. DURING SEQUENCE - PGM ON A SIDE | | | | | | 0 | 0 | 0 | 0 |
| 2. CUT A→B | 1 | 0 | 0 | 0 | 0 | 0 | 1 | 0 | 1 |
| 3. DISSOLVE A→B | 0 | 1 | 0 | 0 | 0 | 0 | ramp up | 0 | 1 |
| 4. P/V DISSOLVE A→B | 0 | 1 | 0 | 1 | 0 | 0 | 0 | 0 | ramp down |
| 5. WIPE A→B | 0 | 0 | 1 | 0 | 0 | 0 | step up | 0 | 1 |
| 6. P/V WIPE A→B | 0 | 0 | 1 | 1 | 0 | 0 | 0 | 0 | step up |
| 7. BORDERED WIPE A→B | 0 | 0 | 1 | 0 | 1 | step up | step up | 0 | 1 |
| 8. P/V BORDERED WIPE A→B | 0 | 0 | 1 | 1 | 1 | 0 | 0 | step up | step up |
| 9. DURING SEQUENCE - PGM ON B SIDE | | | | | | 0 | 1 | 0 | 1 |
| 10. CUT B→A | 1 | 0 | 0 | 0 | 0 | 0 | 0 | 0 | 0 |
| 11. DISSOLVE B→A | 0 | 1 | 0 | 0 | 0 | 0 | ramp down | 0 | 0 |
| 12. P/V DISSOLVE B→A | 0 | 1 | 0 | 1 | 0 | 0 | 1 | 0 | ramp up |
| 13. WIPE B→A | 0 | 0 | 1 | 0 | 0 | 0 | step down | 0 | 0 |
| 14. P/V WIPE B→A | 0 | 0 | 1 | 1 | 0 | 0 | 1 | 0 | step up |
| 15. BORDERED WIPE B→A | 0 | 0 | 1 | 0 | 1 | step down | step down | 0 | 0 |
| 16. P/V BORDERED WIPE B→A | 0 | 0 | 1 | 1 | 1 | 0 | 1 | step up | step up |

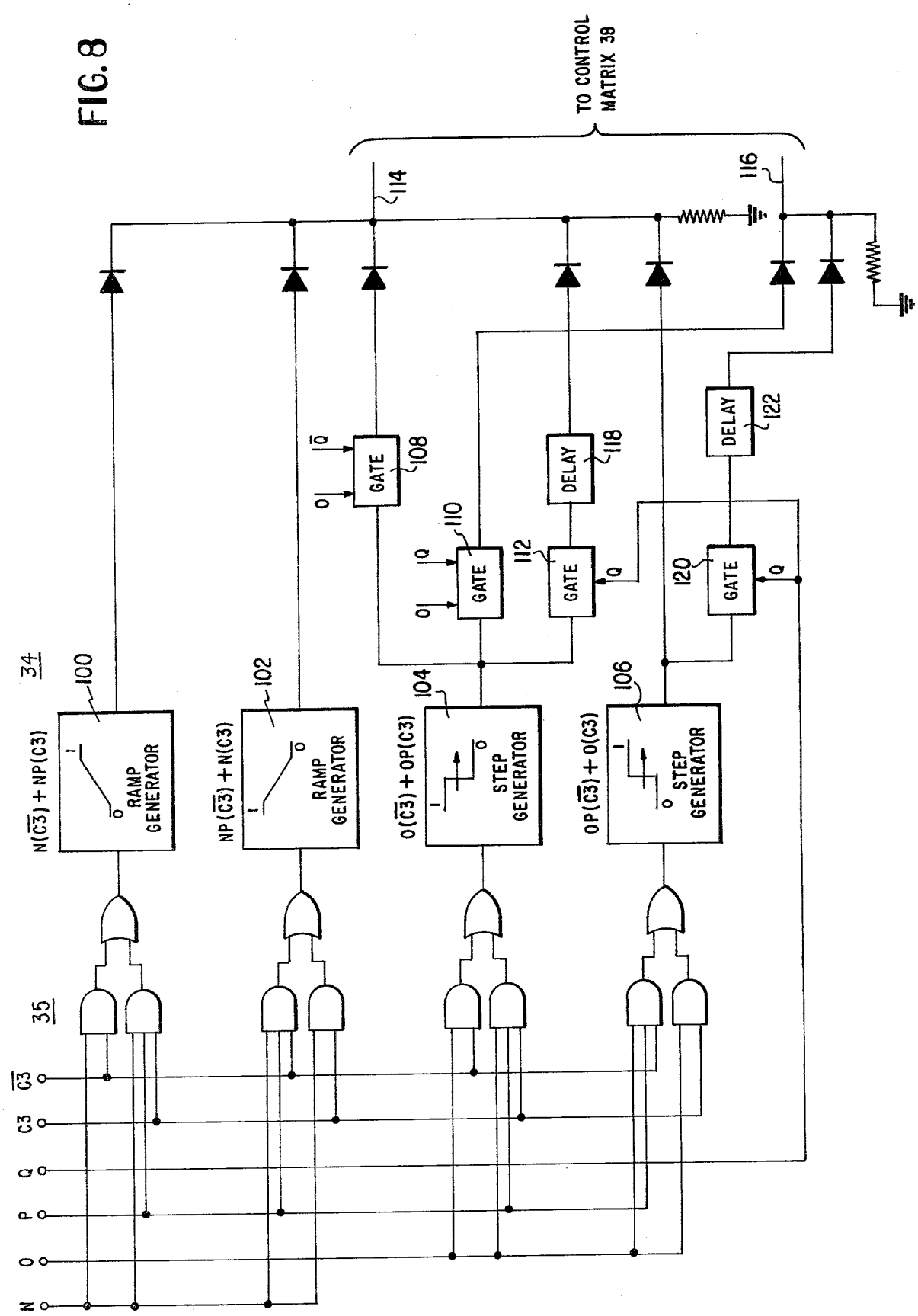

VIDEO TRANSITION CIRCUITRY INCLUDING TRANSITION PREVIEWING MEANS

BACKGROUND OF THE INVENTION

1. Field of the Invention

This invention is directed to circuitry for producing and/or previewing transitions between video signals comprising a television program or the like.

2. Discussion of the Prior Art

As illustrated in FIG. 1, circuitry is known for previewing the next event of a sequence of events comprising a television program. A program transition switch 10 has applied thereto video signals A and B and a control signal C. Switch 10 may be a soft switch, the operation of which is such that the output signal is $[A \times C] + [(1-C) \times B]$. Hence, if C is 0, only the video B signal is passed by the switch and if C is 1, only the video A signal. For values of C between 0 and 1, a mixture of the two signals occurs. The frequency range for the control signal may be anywhere from DC to the highest frequency in the video spectrum, typically 5MHz. Thus, a single soft switch is capable of performing a dissolve between two video signals (C frequency—DC) or acting as an instantaneous switch (C frequency—very high) or any combination of the two by varying only the control signal. A wideband analog multiplier readily performs these functions.

Assuming the "on-air" or program signal is video signal A, C will be 0 and video signal A will occur at the output of switch 10. The next event corresponds to B. In order to preview the next event signal B, signals A and B are also applied to a 2×1 switch indicated at 12 where the switch comprises cross-points 14 and 16. Hence, cross-point 16 can be actuated to permit preview of the next event on a monitor (not shown) connected to the output of switch 12.

In order to make a transition to the next event, the control signal C is changed from 1 to 0, the nature of the change determining the nature of the transition as indicated above. Assuming there is a dissolve to the next event, C would comprise a negative-going ramp signal. Once the transition has been completed, video signal B becomes the "on-air" or program event and the next or preview event is now on the A side. Signal A may now be composed in accordance with known circuitry to include, for example, a background signal B1, a foreground signal F chroma keyed over the background signal B1 and a title over the foreground and/or background signals F and B1. The program signal B now on-air may comprise a simple background scene B2. Once the next scene (video A) has been composed, the operator can preview it by actuating cross-point switch 14 where the P/V video output is connected to the monitor.

There is a shortcoming in the foregoing system in that the operator can only preview the next event and not the transition to that event. Since video signals A and B can become quite complicated as indicated above, the operator desirably not only needs to know what the next event will look like but also the transition to that event. Thus, assuming program or "on-air" event B is B2 and preview or next event A is background B1 with foreground F chroma keyed thereover and with a title over B1 and F and further assuming a wipe transition is desired from video signal B to A, it is desirable that the operator have the capability of previewing this transition before actually producing it on the "on-air" or program line. Further, it is desirable that this capability be readily available to the operator so that the transition preview can be simply effected.

SUMMARY OF THE INVENTION

It is thus a primary object of this invention to provide circuitry for permitting the preview of a transition from one video signal to another where the transition may be, for example, a dissolve, a wipe or a bordered wipe.

It is a further object of this invention to provide circuitry of the above type whereby an operator can effect the transition preview in a straightforward, simple manner.

Other objects and advantages of this invention will be apparent from a reading of the following specification and claims taken with the drawing.

BRIEF DESCRIPTION OF THE DRAWING

FIG. 1 is a schematic diagram of illustrative prior art circuitry for previewing the next event in a television program or the like.

FIG. 5 is a partial truth table illustrating the operation of the circuitry of FIG. 2.

FIG. 8 is a block diagram of illustrative circuitry for generating transition control signals for use in the circuitry of FIG. 2.

DETAILED DESCRIPTION OF THE PREFERRED EMBODIMENTS OF THE INVENTION

Figure 2:
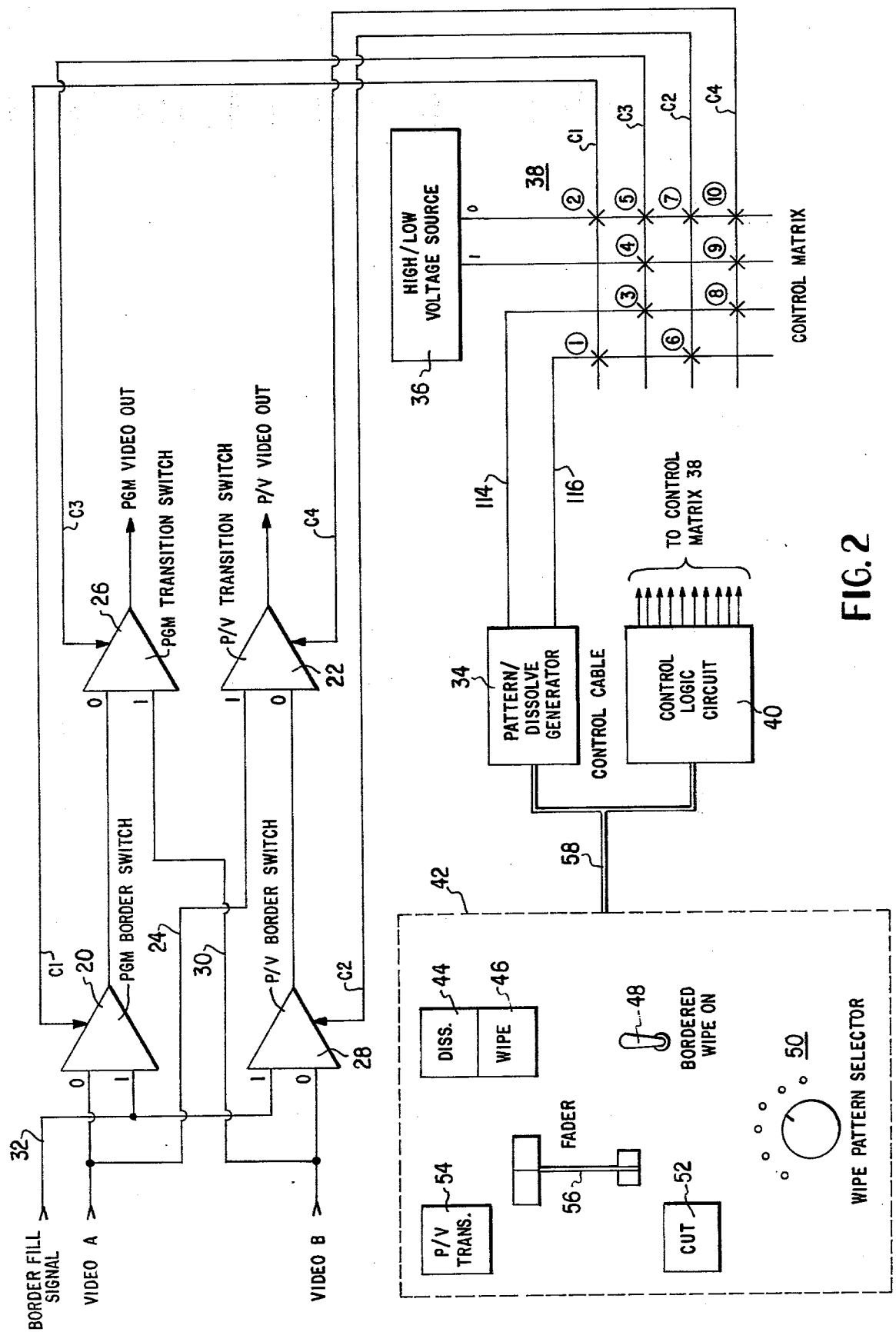
FIG. 2 is a schematic block diagram of an illustrative system for producing and/or previewing transitions between video signals in accordance with the invention.

Referring to the drawing where like reference numerals refer to like parts, and in particular, to FIG. 2, video signal A is applied to program (PGM) border switch 20 and preview (P/V) transition switch 22 via line 24. The output of program border switch 20 is applied to program transition switch 26. Video signal B is applied to preview border switch 28 and to program transition switch 26 via line 30, the output of switch 28 being applied to preview transition switch 22. The "on-air" or program signal is always outputted from switch 26 while the next or preview signal is always outputted from preview transition switch 22. Hence, video signal A will be outputted from switch 26 if A is the "on-air" signal while B will be outputted from switch 22. Alternatively, if B is the "on-air" signal, it will be outputted from switch 26 and A will be outputted from switch 22.

Switches 20, 28, 26 and 22 are respectively under the control of control signals C1, C2, C3 and C4. The input lines to each switch have been referenced with either an 0 or a 1 to indicate the action of the control signal applied thereto. Hence, referring to switch 26, A will be passed therethrough when C3 is 0 while B will be passed when C3 is 1 whereas A will be passed through switch 22 when C4 is 1 and B will be passed when C4 is 0. The operation of switches 20 and 28 is similar to switches 22 and 26 where these switches have a border fill signal applied thereto over line 32, the effect of which will be described hereinafter.

The control signals C1-C4 are generated by a pattern/dissolve generator 34 and a high/low voltage source 36, these signals being applied to a control matrix 38 which is controlled by a control logic circuit 40. Generator 34 and logic circuit 40 are responsive to controls on a control panel 42, the panel having been simplified to contain the controls needed to illustrate the present invention. These controls are a dissolve (DISS) push button switch 44, a wipe push button switch 46, a bordered wipe switch 48, a wipe pattern selector 50, a cut (or take) push button switch 52, a preview transition push button switch 54 and a faded lever 56. The controls 44-56 are connected over control cable 58 to generator 34 and control logic circuit 40 in a manner which will be described in more detail hereinafter.

Figure 1:
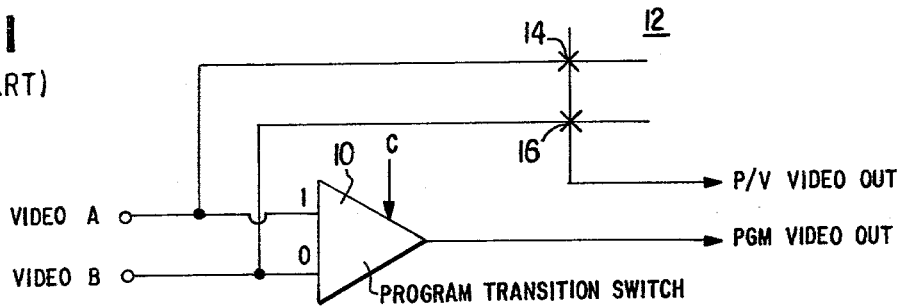
Figure 3:
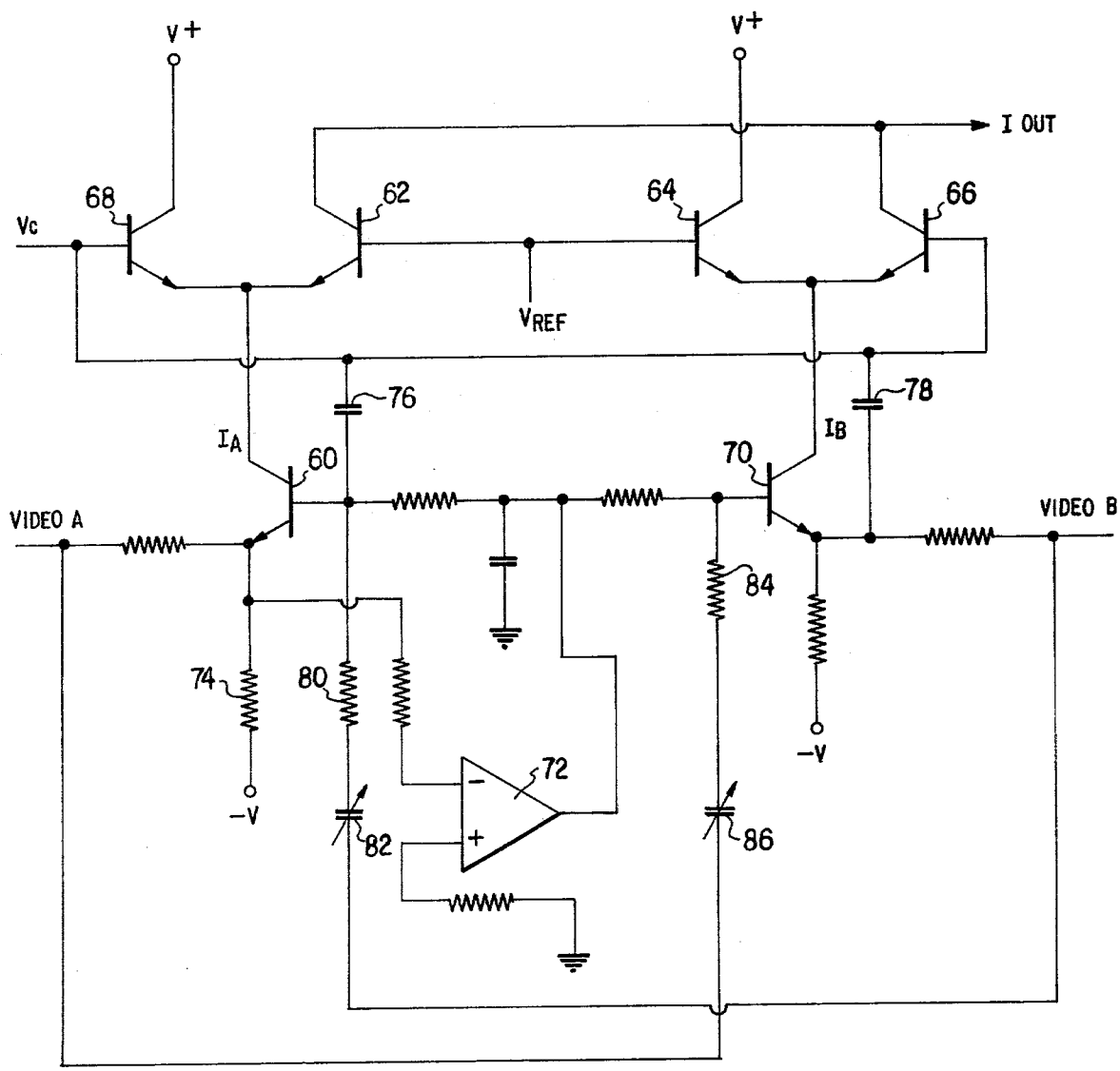
FIG. 3 is a schematic diagram of an illustrative soft switch for use in the circuitry of FIG. 2.

FIG. 3 is a schematic diagram of illustrative circuitry comprising program transition switch 26. In operation, assume $V_C$ corresponds to control voltage C3 and initially is assumed to be negative with respect to reference voltage $V_{REF}$ (that is, 0). Video signal A is applied to current source transistor 60 to modulate current $I_A$, this current being switched to the $I_{OUT}$ terminal via transistor 62 while the current $I_B$ is shunted to the positive power supply V+ via transistor 64. If $V_C$ is positive with respect to $V_{REF}$ (that is, 1), $I_B$ is routed to the $I_{OUT}$ terminal via transistor 66 while $I_A$ is shunted to V+ via transistor 68. If $V_C$ equals $V_{REF}$, the output current is $\frac{1}{2} \times (I_A + I_B)$.

Figure 4A:
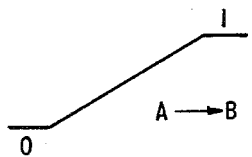
FIGS. 4A–4D illustrate control signal wave forms for effecting illustrative dissolve and wipe transitions in the circuitry of FIG. 3.
Figure 4B:
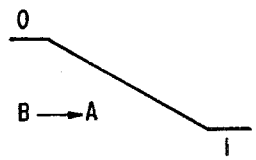
Figure 4C:
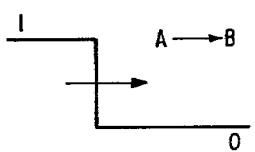
Figure 4D:
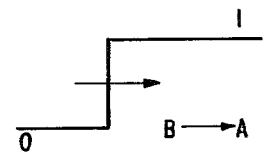

If $V_C$ is a slowly varying, positive-going ramp as illustrated in FIG. 4A, a dissolve is produced from A to B. If it is a slowly varying negative-going ramp as in FIG. 4B, a dissolve from B to A is produced. If C is a negative-going, step voltage, as shown in FIG. 4C, th edge of which moves in the direction of the arrow with respect to successive frames of the video signals A and B, a left-to-right wipe is produced from A to B while if C is a positive-going, step voltage as shown in FIG. 4D, a left-to-right wipe from B to A is produced. In order to produce an abrupt transition from A to B (that is, a cut or take), $V_C$ is simply inverted—that is, changed from 0 to 1. Hence, while video signal A is "on-air", $V_C$ will be 0. In order to make a transition from A to B, $V_C$ must be changed from 0 to 1, the nature of the change from 0 to 1 dictating the type of transition as indicated in FIGS. 4A and 4C.

In order to obtain stable black levels, the DC components of $I_A$ and $I_B$ must be constant. To ensure this, operational amplifier 72 compares the emitter of transistor 68 with ground potential, the assumption being made that voltage $-V$ is unvarying. Hence, the opposite end of resistor 74 is maintained at ground potential to ensure a constant current through resistor 74 and transistor 60. Further, switching spike cancellation is effected by means of condensors 76 and 78. The control signal $V_C$ is differentiated and added to the video signal in anti-phase to the spikes inherent in the switch, the latter spikes being caused by the base-collector capacitances of transistors 62 and 66, these capacitances feeding a small portion of the high frequency component of the control signal into the video signals thus causing the spikes. Further, cross-talk from video signal B to A is cancelled by adding a small amount of video B in antiphase to video A via resistor 80 and variable capacitor 82 while crosstalk cancellation from A to B is effected via resistor 84 and variable capacitor 86.

The switch of FIG. 3 may also be employed as switch 20 wherein the border fill signal would be applied rather than the video B signal and $V_C$ would be C1. Further, the FIG. 3 switch may also be readily employed as switch 22 where the video A and B signals would be interchanged and $V_C$ would be C4 while in switch 28, the video B signal would take the place of the video A signal, the border fill signal would take the place of video A signal and $V_C$ would be C2.

The operation of the circuitry of FIG. 2 will now be described in relation to the partial truth table of FIG. 5. It is assumed the "on-air" or program signal is at the A side—that is, video signal A is the program event currently being transmitted and thus the output from program transition switch 26 while the next event is being passed through preview transition switch 24. Hence, the C1 through C4 signals will be as shown in the first line of the table—that is, they will all be 0. Accordingly, the output from switch 20 will be A as will the output from switch 26. Further, the output from switches 22 and 28 will be B.

In order to effect a cut from A to B, C3 and C4 are inverted with respect to their values given in the first line of the table, the inversions being indicated in the second line of the table. Since C1 and C2 remain at 0, the outputs of switches 20 and 28 will still be A and B respectively. However, due to the inversion of C3 and C4, A and B will now be outputted from switches 22 and 26 respectively. Hence, the program output from switch 26 has been cut from A to B while the preview transition switch 22 output has been cut from B to A. Hence, the program output is now at the B side while the preview output is at the A side. Accordingly, the video A signal may now be processed to compose a new next scene while the "on-air" video B signal is being employed in the program.

The cut transition is effected by depressing cut push button switch 52, this being indicated by a "1" in the M column of the FIG. 5 table where in FIG. 5 all column headings are defined. A preview of a cut is not necessary since the transition occurs practically instantaneously. Hence, simply viewing the preview monitor connected to switch 22 indirectly indicates what will happen in a cut transition.

Next assume a dissolve from A to B is desired as the next transition from the "on-air" event A to the next event B rather than the cut transition described above. In this instance a preview of the dissolve transition is normally desired especially when A and/or B are complicated, composite signals as discussed hereinbefore. In order to preview the dissolve, the operator pushes the dissolve button 44 and the preview transition button 54. This situation is illustrated by line 4 of the FIG. 5 table. Thus, C4 is inverted to a 1. C3 remains the same as line 1 since the A signal must continue out over the program line. Upon inversion of C4, the A signal is also switched out of switch 22. Fader lever 56 may then be moved from one of its extreme positions to the other to generate a negative-going ramp as shown in line 4 of the table, the generation of such ramps by fader levers being well known in this art and being discussed in further detail hereinafter with respect to FIG. 8. Thus, it is possible with the circuitry of FIG. 2 to preview not only the next event but the transition thereto while leaving unaffected the program output from switch 26. At the end of the transition preview, the C1 through C4 outputs of line 4 of the table will be exactly the same as line 1. Hence, assuming the transition preview was satisfactory to the operator, the dissolve transition can now be effected at switch 26 once preview transition button 54 is turned off. If not, either adjustments can be made to video signal B or another transition, such as a wipe, can be previewed.

Assuming the dissolve transition preview was satisfactory, a dissolve of the "on-air" program can now be effected in the following manner. The operator pushes the dissolve button 44, this being indicated in line 3 of the FIG. 5 table. Since control signals C1–C4 are as shown in line 1 of the table, it is apparent C3 and C4 are affected by actuation of dissolve button 44. The inversion of C4 causes video signal A to be switched to the preview monitor via switch 22. A may then be processed as described above with respect to the cut transition preparatory to the A signal being switched "on-air". The C3 signal is a positive-going ramp generated by movement of fader lever 56 from one of its extreme positions to the other as described above. When the ramp reaches the 1 level, the dissolve transition from A to B is complete with the B side video signal now being outputted as the program signal via switch 26.

If a wipe from A to B is desired rather than the cut or dissolve described above, the wipe may first be previewed as indicated in line 6 of the table by pushing wipe button 46 and preview transition button 54. The wipe pattern selector 50 will also be actuated to select the type of wipe. However, actuation of selector 50 does not affect control signals C1–C4. The C4 control signal is inverted and then the positive-going, step signal shown in line 6 (corresponding to FIG. 4D) is generated by moving the fader lever 56 from one of its extreme positions to the other. As above with the dissolve transition, C3 remains unchanged from its value in line 1 of the table since the "on-air" event is unaffected by the preview of the transition.

The program transition may then be effected (assuming the preview is satisfactory) by simply pressing the wipe button 46 as indicated by line 5 of the table. The resulting action is similar to that described for the dissolve from A to B (line 3 of the table), the basic difference being the nature of the transition from the 0 to 1 level as indicated in FIG. 4C.

Figure 6A:
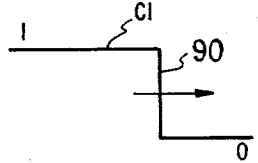
FIGS. 6A–6D illustrate the operation of an illustrative bordered wipe transition as implemented by the circuitry of FIG. 2.

Next a bordered wipe transition will be described as indicated in line 7 of the table. This is effected by the operator pushing wipe button 46 and switching bordered wipe switch 48 to its on position. C4 is inverted from the value shown in line 1 of the table for the same reason it was inverted in line 2 (cut) as discussed above. Control signals C1 and C3 are as shown in line 7 and are illustrated in more detail in FIGS. 6A and 6B. In FIG. 6A, there is illustrated control signal C1, this signal effecting a wipe transition from the video signal A applied to switch 20 to the border fill signal applied over the line 32. The border fill signal may be a color matte of preselected hue. Above the C1 signal is illustrated the transition which would be viewed on a monitor connected to the output of switch 20, the dividing line between video A and the border fill signal being indicated at 80 and corresponding in position to the moving edge 90 of C1. The border fill signal would fill the monitor screen with the selected hue as the edge 90 moves to the right.

The edge 92 of control signal C3 is delayed in time with respect to the edge 90 of C1 whereby the dividing line 82 is developed between the border fill signal and video B, the illustration above the C3 signal being the transition viewed in a monitor connected to the output of switch 26. Hence, a bordered wipe transition from A to B is effected, the width of the border extending between lines 80 and 82. Once the edge 92 reaches a position in time corresponding to the right edge of the monitor screen, the bordered wipe will be completed.

In order to effect a preview of the bordered wipe, dissolve push button 44 and preview transition button 54 are pressed and the bordered wipe switch is turned on, this condition being indicated in line 8 of the FIG. 5 table. C2 and C4 are thus inverted to 1's whereby the border fill signal is outputted from switch 28 and A is outputted from switch 22. Referring to FIGS. 6C and 6D, the C2 and C4 control signals are illustrated, these signals being generated as the fader lever 56 is moved from one of its extreme positions to the other. Thus, the illustration over the C2 signal in FIG. 6C corresponds to what would be displayed on a monitor if it were connected to the output of switch 28, the dividing line 84 between video B and the border being defined by the edge 86 of the C2 signal. The C2 signal is delayed in time with respect to the C4 signal where edge 88 of C4 defines the boundary line 89 between A and the border fill. Hence, the bordered wipe may accordingly be previewed on a monitor connected to the output of switch 22. It should be noted that while C2 is delayed with respect to C4 (see FIGS. 6C and 6D), C3 is delayed with respect to C1 (see FIGS. 6A and 6B) when the bordered wipe transition from A to B is made on the "on-air" signal from switch 26.

There has now been described with respect to the partial truth table of FIG. 5 the various transitions which can be produced or previewed when the transition occurs from video signal A to B. This type of transition implies that the "on-air" signal is video A and the next scene is B. The remainder of the FIG. 5 table is directed to the situation where B is the "on-air" signal and the transition is made from B to A. In line 9, the states of C1–C4 are shown when B is the "on-air" or program scene. Further, the states of C1–C4 are shown in the table for the various transitions described above for A to B transitions. With respect to the bordered wipe from B to A shown in line 15, the C1 and C3 signals are the same as the C2 and C4 signals used for previewing a bordered wipe from A to B as shown in line 8. Thus, C1 is delayed with respect to C3 by an amount corresponding to the border width. Also the C2 and C4 control signals used for the preview of a bordered wipe from B to A (line 16) are the same as the C1 and C3 signals used for the program bordered wipe from A to B (line 7). Hence, C4 is delayed with respect to C2 by an amount equal to the border width.

Figure 7:
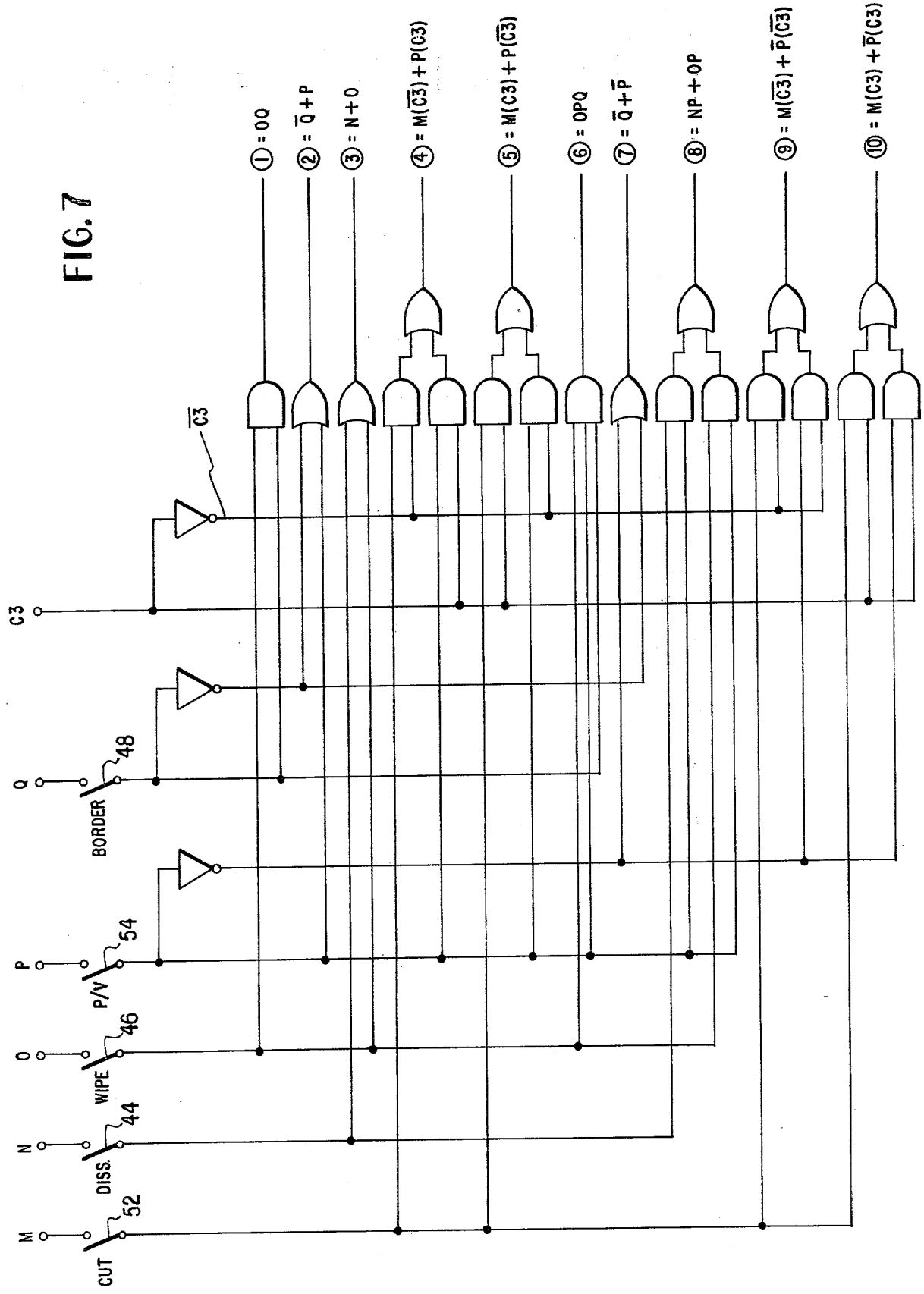
FIG. 7 is a schematic block diagram of an illustrative control logic circuit for use in the circuit of FIG. 2.

FIG. 7 is a schematic diagram of illustrative circuitry for implementing the control logic circuit 40. The inputs to circuit 40 are the controls 44, 46, 48, 52 and 54 of control panel 42 together with the C3 control signal and the outputs are the ten output lines ①–⑩ respectively connected to the ten cross-point switches ①–⑩ illustrated in the control matrix 38 in FIG. 2. The input lines M–Q are defined in the FIG. 5 truth table. The ① output in FIG. 7 is conditioned when wipe button 45 is pressed and bordered wipe switch 48 is closed to thereby actuate the ① cross-point of matrix 38. Hence, the matrix is conditioned to pass the border control signal C1 from generator 34 to program border switch 20 of FIG. 2. The ④ and ⑨ outputs of logic circuit 40 are involved when a cut transition from A to B is effected by pressing cut button 52. A determination as to whether A or B is "on-air" is made by testing the status of C3. Thus, if the A video signal is "on-air" as indicated in line 1 of the FIG. 5 table, C3 will be 0. Hence, the cut is to be made from A to B by changing C3 to a 1. Accordingly, the ④ output is conditioned by the presence of a closed cut switch 52 and 53 being equal to 0 (that is, M($\overline{C3}$)). The conditioning of the ④ output of logic circuit 40 thus actuates the ④ crosspoint of matrix 38 to make C3 a 1. Hence, the inversion of C3 is effected. C4 is also inverted since output ⑨ is also responsive to M($\overline{C3}$).

If the cut is from B to A, the status of C1–C4 will be as shown in line 9 of the FIG. 5 table. Hence, C3 will be 1. Thus, when cut button 52 is pressed, the 1 condition of C3 and the closure of switch 52 condition the ⑤ output of logic circuit 40 [M(C3)] to invert C3 as required by the cut transition from B to A. Further, C4 is also inverted since output ⑩ is also responsive to M(C3).

The remaining outputs of the control logic circuitry of FIG. 7 correspond to the partial truth table of FIG. 5 where in particular the C1 column of the FIG. 5 table corresponds to the ① and ② outputs of logic circuit 40, the C3 column corresponds to outputs ③–⑤, the C2 column corresponds to outputs ⑥ and ⑦ and the C4 column corresponds to outputs ⑧–⑩.

In FIG. 8, a pattern and dissolve generator 34 is shown together with control circuitry 35 for use therewith and comprises a positive-going ramp generator 100, a negative-going ramp generator 102, a negative-going step voltage generator 104 and a positive-going step voltage generator 106 where each generator is responsive to fader lever 56 to generate its particular output signal as the fader lever is moved from one of its extreme positions to the other.

The positive-going ramp produced by generator 100 is required whenever a program dissolve from A to B (line 3 of the FIG. 5 table) or a preview of a transition from B to A (line 12) is desired. As is the case with the logic circuit 40 of FIG. 7, a determination is made as to whether the video A or the video B signal is "on-air" by testing C3 where as is evident from lines 1 and 9 of the FIG. 5 table, A is "on-air" when C3 is 0 and B is "on-air" when C3 is 1. The Boolean expression of the foregoing conditions is indicated above ramp generator 100. Generator 102 is similarly conditioned as indicated in lines 4 and 11 of the truth table and the expression above the generator to produce a negative-going ramp.

In order to generate the negative-going step voltages shown in lines 5 and 14 of the table of FIG. 5, generator 104 is actuated in accordance with the Boolean expression shown above it. Further, the generator output is applied to gates 108, 110 and 112. As can be seen in FIG. 8, gates 110 and 112 are not conditioned unless the bordered wipe switch 48 has been turned on. Hence, only gate 108 is conditioned when a non-bordered wipe is desired as is the case in lines 5 and 13 of the FIG. 5 table. Hence, the negative-going step voltage from generator 104 will be applied to control matrix 38 via gate 108 and line 114. In a similar manner the nonbordered wipes indicated by lines 6 and 13 of the FIG. 5 table are generated over line 114 by step generator 106 as shown in FIG. 8. The step generators 104 and 106 may be as described in U.S. Pat. No. 2,240,420, which is incorporated herein by reference.

Figure 6B:
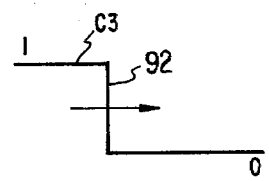
Figure 6C:
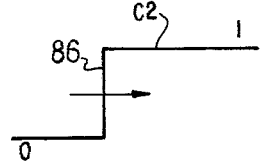
Figure 6D:
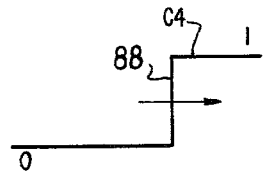

The bordered wipe signals in lines 7 and 16 of the FIG. 5 table correspond to those shown in FIGS. 6A and 6B where the step voltage signal applied to line 114 is delayed with respect to the step voltage signal applied to line 116 by an amount corresponding to the border width. Hence, when a bordered wipe from A to B on the program line is desired as indicated in line 7 of the FIG. 5 table or if a preview of a bordered wipe from B to A as indicated in line 16 is desired, the wipe and bordered wipe switches 46 and 48 will be actuated thereby conditioning gates 110 and 112. The output of gate 110 is directly applied to line 116 while the output of gate 112 is delayed by delay circuit 118 where the delay may be variable and corresponds to the desired border width. Hence, the desired timing between the step voltages on lines 114 and 116 is effected.

Further, if a preview of a bordered wipe from A to B or a bordered wipe from B to A (see lines 8 and 15) is desired, step generator 106 will be actuated as will gate 120. Since the wave forms of FIGS. 6C and 6D are to be implemented, the step signal on line 114 will lead the step signal on line 116 by the desired border width. Accordingly, the output of generator 106 is applied directly to line 114 while the signal applied to line 116 is delayed by an amount established by delay circuit 122 where the delay corresponds to the desired border width.

It should be understood that the above circuitry of FIG. 8 is simply illustrative and is employed to illustrate the operation of the associated video and transition circuitry of this invention and that other circuitry other than that of FIG. 8 may readily be employed. Various other modifications of the transition previewing circuitry described hereinbefore may be made without departing from the intended scope of the present invention. Thus, for example, rather than manually entering the transition modes through control panel 42, this information may be stored in a memory together with other information defining, for example, the scene characteristics, such program memories being employed in known automatic television programming control systems. Further, a microprocessor may be employed to execute the instructions entered through control panel 42 or from the above-mentioned program memory.

What is claimed is:

1. Improved video transition circuitry including means for previewing transitions from an on-air event signal to a next event signal comprising
    program transition means responsive to said on-air event and next event signals for outputting the on-air event signal;
    preview transition means responsive to said on-air event and said next event signals for outputting said next event signal; and
    transition control means for either (a) controlling said program transition means to effect a predetermined transition at the output of said program transition means from said on-air event signal to said next event signal or (b) controlling said preview transition means to effect a preview of the said predetermined transition at the output of said preview transition means.

2. Circuitry as in claim 1 where said transition control means includes (1) means for switching said on-air event signal to the output of said preview transition means in place of said next event signal and (2) means for changing the output at said preview transition means from said on-air event signal back to said next event signal in accordance with said predetermined transition to thereby effect said preview of the predetermined transition at the output of the preview transition means.

3. Circuitry as in claim 1 or 2 where said transition control means includes means for effecting a dissolve from said on-air event signal to said next event signal at the output of said program transition means.

4. Circuitry as in claim 3 where said transition control means includes means for effecting a preview of said dissolve at the output of said preview transition means.

5. Circuitry as in claim 1 or 2 where said transition control means includes means for effecting a wipe from said on-air event signal to said next event signal at the output of said program transition means.

6. Circuitry as in claim 5 where said transition control means includes means for effecting a preview of said wipe at the output of said preview transition means.

7. Circuitry as in claim 1 or 2 where said transition control means includes means for effecting a bordered wipe from said on-air event signal to said next event signal at the output of said program transition means.

8. Circuitry as in claim 7 where said transition control means includes means for effecting a preview of said bordered wipe at the output of said preview transition means.

9. Circuitry as in claim 2 where said transition control means includes means for maintaining said on-air event at the output of said program transition means while said preview of the predetermined transition is being effected.

10. Circuitry as in claim 1 including a control panel and where said transition control means includes transition preview switching means disposed at said control panel.

11. Circuitry as in claim 10 where said transition control means includes transition switching means disposed at said control panel.

12. Circuitry as in claim 11 where said transition control means includes a fader lever disposed at said control panel.

13. Circuitry as in claim 12 where said transition control means includes circuit means responsive to said transition switching means and said fader lever for effecting said predetermined transition at the output of the program transition means.

14. Circuitry as in claim 13 where said circuit means includes further circuit means responsive to said transition preview switching means, said transition switching means and said fader lever for effecting said preview of said predetermined transition at the output of said preview transition means.

15. Circuitry as in claim 14 where said transition switching means comprises a switch for effecting a dissolve from the on-air event signal to the next event signal.

16. Circuitry as in claim 14 where said transition switching means comprises a switch for effecting a wipe from said on-air event signal to said next event signal.

17. Circuitry as in claim 14 where said transition switching means comprises a switch for effecting a bordered wipe from said on-air event signal to said next event signal.

* * * * *